(12) United States Patent
Chahroudi

(10) Patent No.: US 7,800,808 B2
(45) Date of Patent: Sep. 21, 2010

(54) PREPARATION OF LIGHT VALVES

(76) Inventor: Day Chahroudi, 41 Juniper Hill Loop, Cedar Crest, NM (US) 87008

(*) Notice: Subject to any disclaimer, the term of this patent is extended or adjusted under 35 U.S.C. 154(b) by 849 days.

(21) Appl. No.: 10/552,758

(22) PCT Filed: Apr. 9, 2004

(86) PCT No.: PCT/US2004/010979

§ 371 (c)(1),
(2), (4) Date: Jul. 24, 2006

(87) PCT Pub. No.: WO2004/092806

PCT Pub. Date: Oct. 28, 2004

(65) Prior Publication Data

US 2006/0262374 A1 Nov. 23, 2006

Related U.S. Application Data

(60) Provisional application No. 60/461,141, filed on Apr. 9, 2003.

(51) Int. Cl.
G02F 1/01 (2006.01)
(52) U.S. Cl. .................................................... 359/288
(58) Field of Classification Search ......... 359/240–242, 359/245, 247, 250, 253, 254, 263, 265, 267, 359/269, 270–274, 296, 315, 318, 321, 577, 359/578, 601–604, 609, 839, 843, 288; 252/583, 252/800; 204/290.07; 428/426; 546/257
See application file for complete search history.

(56) References Cited

U.S. PATENT DOCUMENTS 3,953,110 A 4/1976 Chahroudi
4,952,035 A 8/1990 Yuasa et al.
5,120,379 A * 6/1992 Noda et al. .................. 156/107
5,377,042 A 12/1994 Chahroudi
5,674,559 A 10/1997 Riemer et al.
5,856,211 A * 1/1999 Tonazzi et al. ................ 438/69
5,922,805 A 7/1999 Bouttefort et al.
6,001,487 A 12/1999 Ladang et al.
6,084,702 A * 7/2000 Byker et al. ................. 359/288
6,094,290 A * 7/2000 Crawford et al. ............ 359/241

FOREIGN PATENT DOCUMENTS

| EP | 0 650 320 B1 | 11/1999 |
| EP | 0 652 827 B1 | 12/2001 |
| EP | 0 597 853 B1 | 3/2002 |
| EP | 0 572 411 B1 | 8/2003 |
| WO | WO 93/02380 | 2/1993 |
| WO | WO 02/08296 | 1/2002 |

OTHER PUBLICATIONS

* Partial European Search Report in EP 04 75 9334 dated Aug. 10, 2006.
** European Search Report in EP 04 75 9334 dated Oct. 13, 2006.

* cited by examiner

Primary Examiner—Joseph Martinez
(74) Attorney, Agent, or Firm—Roberts Mlotkowski Safran & Cole, P.C.

(57) ABSTRACT

Light valves which are controlled by temperature are made by rapidly injecting between two closely spaced sheets, of e.g. glass, a low viscosity monomer+solvent solution, and then rapidly polymerizing the monomer to form a solid layer, which is transparent below a specified temperature, and opaque above that temperature. The low viscosity of the monomer solution and its rapid polymerization makes mass production economically practical. Production machinery for these light valves may be adapted from existing machinery that has been made for manufacturing sealed, double pane windows.

64 Claims, 4 Drawing Sheets

PREPARATION OF LIGHT VALVES

CROSS-REFERENCE TO RELATED APPLICATIONS

This application is a national stage of International Application No. PCT/US2004/010979, filed 9 Apr. 2004, which claims benefit of U.S. Provisional Patent Application No. 60/461,141, filed 9 Apr. 2003. The entire contents of all the above-identified applications are incorporated herein by reference.

INTRODUCTION

Thermally activated light valves may be prepared as a layered structure consisting of two cover sheets, at least one of which admits light, such as glass, and with a layer of optically active material sandwiched between the cover layers (see FIG. 1B). This optically active layer may consist of a polymer in solution, where the polymer reversibly precipitates upon heating to a critical or "switching" temperature for this particular polymer+solvent pair (see U.S. Pat. Nos. 3,953,110 and 5,377,042, and EP 0 597 853 B1 derived from PCT/US91/05055, all by author). The finely divided polymer that precipitates must have a different refractive index than the solvent, and thus the optically active layer turns a reflective, relatively opaque white above the switching temperature, but below the switching temperature, the light valve is as relatively transparent and can be as optically perfect as the cover sheets, e.g. plate glass.

There are many uses for light valves, ranging from computer memories to time variable holograms such as phase conjugation mirrors. The industrial applications of light valves include architectural glazings such as skylights, greenhouses, passive solar heat collectors, sunrooms, etc. (see EP O 572 411 B1 derived from PCT/US91/07620, EP 0 652 827 B1 derived from PCT/US93/05173, and EP O 650 320 B1 derived from PCT/US93/04994, all by author). The further Requirements list and the Examples and the Manufacturing Methods sections below all relate to architectural glazings. However, architectural optical shutters and their manufacturing methods may, sometimes with modification, be useful for other purposes and products.

DESCRIPTION OF THE INVENTION AND PROBLEMS WITH PREVIOUS PROCEDURES AND MATERIALS

Throughout this document, including the Claims, "polymer" is meant to include "polymers" and "copolymers", and "solvent" is meant to include "mixture of solvents". "Solvent", although usually referring to a liquid, can also refer to a solid, as e.g. some polymers form solid solutions with each other, and some of these solutions with solid solvents undergo mutual incompatibility upon heating, resulting in phase separation between the two polymers, and thus exhibiting light valve behavior.

Previously light valve samples were prepared by filling between two closely spaced sheets of glass with an optically active aqueous polymer solution (see first of above references). In order for the polymer solution to turn from a viscous liquid to a weak crosslinked solid, soaked with solvent, or "gel", the polymer can be crosslinked after filling by the previous addition of a reducer+oxidizer catalyst pair, such as sodium hypophosphite and hydrogen peroxide, and a crosslinking monomer, such as 2% methylene bisacrylamide (MBA). The catalyst pair creates free radicals, which transfer to the MBA to activate it, and which also abstract hydrogen from the polymer chain, thereby making sites for the MBA to covalently bond to the polymer chain. Since the MBA is bifunctional, it can covalently bond to two polymer chains, thus crosslinking them to form a solid gel, with the polymer chains still in solution. Examples of optically active polymers used for this procedure include poly N-vinyl caprolactam, and poly N-isopropyl acrylamide, both in aqueous solution.

In order for the optically active layer to have mechanical properties which are adequate to bond the two cover sheets together, the polymer concentration is preferably 30% or greater. A problem with the above polymers is that even when the degree of polymerization is as low as approximately 50, as determined by dialysis, (the lower limit for easily obtaining adequate crosslinking for gel formation), the viscosity of a 30% polymer aqueous solution is 20,000 centipoise. This high viscosity makes it difficult to remove atmospheric oxygen from the polymer solution. More importantly, when filling a 1 to 3 millimeter thick cavity between the two cover sheets of e.g. glass joined together at their edges by a narrow strip of sealant (see FIG. 1), this high viscosity prevents a rapid filling operation. If the filling pressure of the polymer solution is increased in order to obtain a reasonable fill time, this high pressure breaks the glass, even when a reinforcing clamp on the glass is used. Further, the inner seal adhesion may fail, due to high injection pressure, and the polymer solution leaks past the seal near the fill port.

In order to achieve a particular desired switching temperature for a light valve, it is possible to mix two or more monomers, e.g. one monomer whose homopolymer switches above the desired temperature, and the other a monomer whose homopolymer switches below the desired temperature, mixed in the proportions such that the desired switching temperature is achieved (see FIG. 2). The switching temperature of a polymer solution can also be manipulated by changing the solvent or solvent mixture. For example, dissolving some inorganic salt in a water solvent will typically lower the switching temperature of the polymer/solvent solution.

A fairly random copolymer is usually required for the light valve to switch "sharply", that is, over a small temperature range (see FIG. 2). The mixture of monomers must have similar copolymerization rates in order for the copolymer that they form to be fairly random. The monomer mixture, including the crosslinking monomer, should usually all also belong to the same category of monomers, so that the copolymerization is fairly random. For rapid and complete polymerization, monomers with conjugated unsaturation may be preferred. In the event of breakage of one of the cover sheets, the polymerized gel may be preferred to be non-toxic for some applications. In this case, polymerization must usually be fairly complete, because most unpolymerized monomers would render the finished gel toxic.

Reversible, non-chemical interchain bonds (e.g. Hydrogen or solvent phobic bonds), between the polymer chains in solution make the light valve's switching not sharp and the temperature of switching a sensitive function of the concentration of the polymer in the solvent (see FIG. 3). Thus, if the seal between the two cover sheets of e.g. glass is ruptured and solvent evaporates, the switching temperature of the light valve will drift. An example of a monomer pair which fails due to interchain bonding is hydroxyethyl acrylate+hydroxypropyl acrylate in aqueous solution. In this case the interchain bonds are hydrogen bonds between the hydroxy groups which are pendant from the polymer chains. These interchain bonds may also cause a hysteresis in the switching characteristics of the light valve, such that the switching temperature on heating is higher than the switching temperature on cooling. This would be useful, for example, in computer memories, but may be a problem for light valves. A further problem with this copolymer is that it slowly reacts with the solvent, by ester hydrolosys.

Catalysts for initiating polymerization, or crosslinking, or gelling, or curing, may be unsatisfactory for the following reasons: Ultraviolet light activated photoinitiators do not work with glass cover sheets because glass is not transparent to the wavelengths (typically the mercury emission line at 316 nanometers) required to activate most UV photoinitiators. Visible light activated photoinitiators are usually unsatisfactory because they are slow and also because their reaction products generally impart to the light valve the property of yellowing by sunlight and/or oxygen, which is sometimes undesirable. Organic peroxide catalysts generally require accelerators such as organic cobalt or vanadium compounds, usually used with tertiary amine bases. These accelerators generally either themselves yellow in sunlight or cause the polymer to yellow in sunlight. For example, the reducer+oxidizer catalyst system of ascorbic acid+hydrogen peroxide exhibits excellent properties except that the ascorbic acid and/or its reaction products turn yellow in sunlight and/or oxygen. When the ascorbic acid is replaced with a hypophosphite salt as the reducer that is used with the hydrogen peroxide oxidizer, the yellowing problem is solved, but the time for the solution to crosslink and gel after mixing in the two catalyst components and filling is extended to 3 hours, which is often too slow.

FIG. 1b shows a cross-section of the sandwich of FIG. 1a.

NEW PROCEDURES AND MONOMER SPECIFICATIONS—DETAILED DESCRIPTION

Figure 1A:
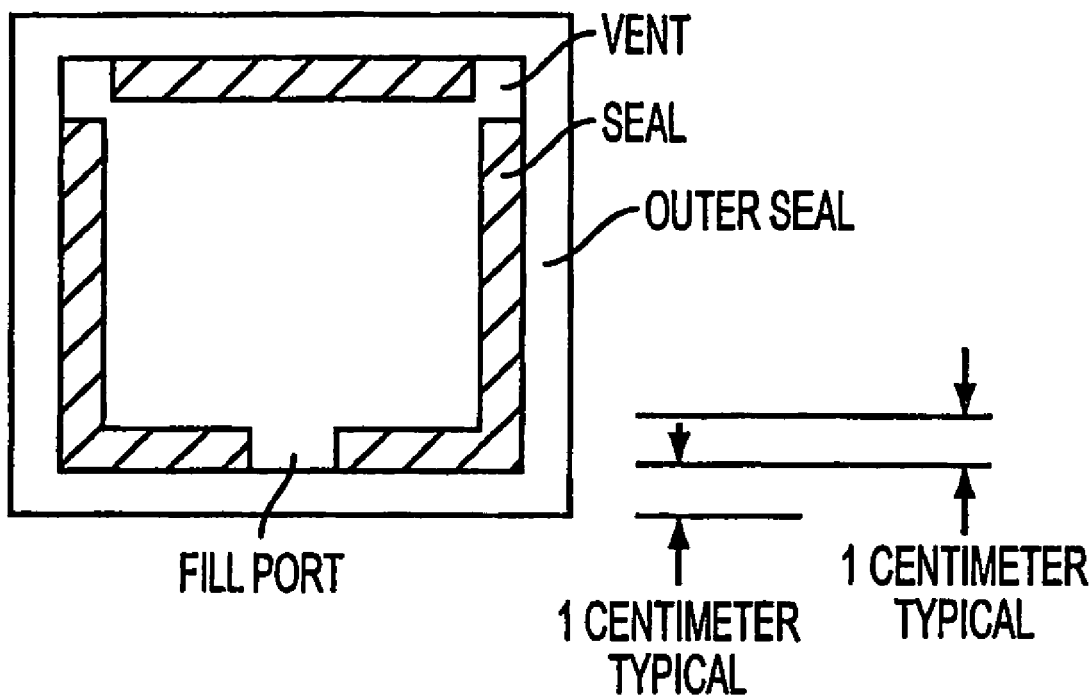
FIG. 1a shows a light valve which includes a sandwich comprising two cover layers and a cavity in between the two layers.

In order to obtain rapid fill and gel rates, a new approach is required. Since a solution of a polymer with even a low degree of polymerization is too viscous for rapid filling, filling with a solution of monomer is used, so that both the polymer and the crosslinks are formed simultaneously after filling the monomer+crosslinker+catalyst solution between the cover sheets. Using a monomer solution rather than a polymer solution decreases viscosity by a factor of approximately 1,000, with a consequent decrease in the fill time by a factor of approximately 50.

The N-vinyl caprolactam monomer with a water solvent is not suitable for this new process due to its limited solubility in water at room temperature, and also due to its slow polymerization, which must be driven by harsh conditions such as temperatures above the switching temperature of the light valve. A further problem is that the poly N-vinyl caprolactam "backbone" has pendant lactam rings that stearicly hinder the backbone from making the conformational changes necessary for phase separation with good sharpness. The N-isopropyl acrylamide monomer, although it polymerizes rapidly and completely under mild conditions, is also unsuitable for this new process, due to its limited solubility in water (both of these monomers are solids at 20° C., which correlates with their low solubility at that temperature). To make this rapid fill and gel procedure possible, monomers must be molecularly designed to fit the procedure, which defines the first two of the Monomer Specifications below.

For light valves which switch, for example, within the range of 25 to 30° C., the monomer/solvent pair is chosen where the resulting polymer precipitates from solution within that temperature range. However, if the polymer is formed by the polymerization of an unsaturated monomer, as is usually the case, then this vinyl unsaturation will make the monomer slightly more hydrophobic than the polymer that it forms, which does not have the unsaturation. This means that the monomer will be less soluble before it is polymerized. This solubility difference makes it difficult to find a monomer which both exhibits precipitation on heating when it is in polymer form, and which is also sufficiently soluble at temperatures below the precipitation temperature of the polymer. This difficult requirement generally implies that the monomer is a liquid at e.g. 20° C. below the precipitation temperature of the polymer, thus increasing its heat of solution and solubility.

Further, the polymerization of e.g. unsaturated monomers, occurring in solution, is exothermic, thus heating the monomer/polymer solution during polymerization. However, if the polymerization occurs above the switching temperature of the light valve, the optical properties usually suffer: e.g. the switching from clear to opaque is less sharp; i.e. it occurs over a larger temperature range, and there may also be a permanent haze when the light valve is in its clear (or transmissive) state. For this reason the monomer solution and/or cover layers can be cooled to e.g. 20° C. (for monomers with conjugated unsaturation) below the switching temperature of the light valve during the filling and polymerization/crosslinking. Thus, the heat of polymerization will not raise the temperature of the monomer+polymer+solvent solution above its transition temperature.

A desirable monomer and solvent pair for preparing light valves with the above rapid preparation procedure must meet all of the following Monomer Specifications:

The monomer is at least 15%, and preferably 35% soluble in the solvent at a temperature enough below the switching temperature of the corresponding polymer+solvent solution that the heat of polymerization does not raise the solution's temperature to its switching temperature at any stage during the polymerization process.

Polymerization is rapid.

Forms a polymer which reversibly precipitates from solution upon heating to the desired temperature.

For some applications there are further monomer requirements:

Polymerization is repeatable, and substantially complete.

The copolymer formed is fairly random.

There are few reversible, non-chemical interchain bonds formed between the polymer chains in solution, besides the intended irreversible covalent crosslinks which are made to form a gel.

When in solution, the polymer's backbone is relatively free from stearic hinderance and is flexible when dissolved in the solvent. This facilitates reversible separation of the polymer from the solvent upon heating to a specific narrow temperature.

Forms a polymer which does not react with the solvent, oxygen, and/or sunlight.

The polymer gel, when below its switching temperature, should exhibit high optical quality, without delamination from the cover sheets, haze, or yellowing after accelerated aging and field testing.

The polymer gel must be non-toxic and safe to dispose of.

The monomer and solvent are relatively inexpensive to manufacture.

New Materials

There is a class of monomers, some of whose members satisfy all of the above Monomer Specifications and Requirements when they are used with water as the solvent: the N-substituted acrylamides. A simplified general structure for some of these monomers, along with 7 examples of monomers of interest, is shown below:

Typical Acrylamide Monomers

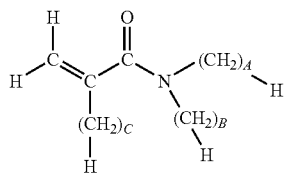

| Acronym | Chemical Name | A | B | C | A + B + C |
|---|---|---|---|---|---|
| DEA | N-diethyl acrylamide | 2 | 2 | 0 | 4 |
| DMA | N-dimethyl acrylamide | 1 | 1 | 0 | 2 |
| TBA | N-tertiary butyl acrylamide | 4 | 0 | 0 | 4 |
| DMMA | N-dimethyl methacrylamide | 1 | 1 | 1 | 3 |
| MEMA | N-methyl ethyl methacrylamide | 1 | 2 | 1 | 4 |
| DEMA | N-diethyl methacrylamide | 2 | 2 | 1 | 5 |
| DMEA | N-dimethyl ethacrylamide | 1 | 1 | 2 | 4 |

The subscripts A, B, and C taken together indicate the number of methylene groups in the monomer and their locations (although acrylamide monomers with satisfactory properties can be made without methylene groups, and some monomers which are not acrylamides may satisfy the Monomer Specifications and some or all of the Requirements). The sum A+B+C approximately indicates the hydrophobicity of the monomer and the polymer which it forms. A good candidate acrylamide monomer should usually have A+B+C between 3 and 5 for a light valve switching near 30° C. with a solvent of water, and should usually also be liquid at e.g. 5° C., which implies that neither A nor B are zero, in order to avoid the presence of a polar amide hydrogen, which would raise the melting point of the monomer, as is the case with N-isopropyl acrylamide (with A=3, B=0, C=0), which melts at 64° C., and is not sufficiently soluble in water for making a light valve with a switching temperature as low as 30° C.

Figure 2:
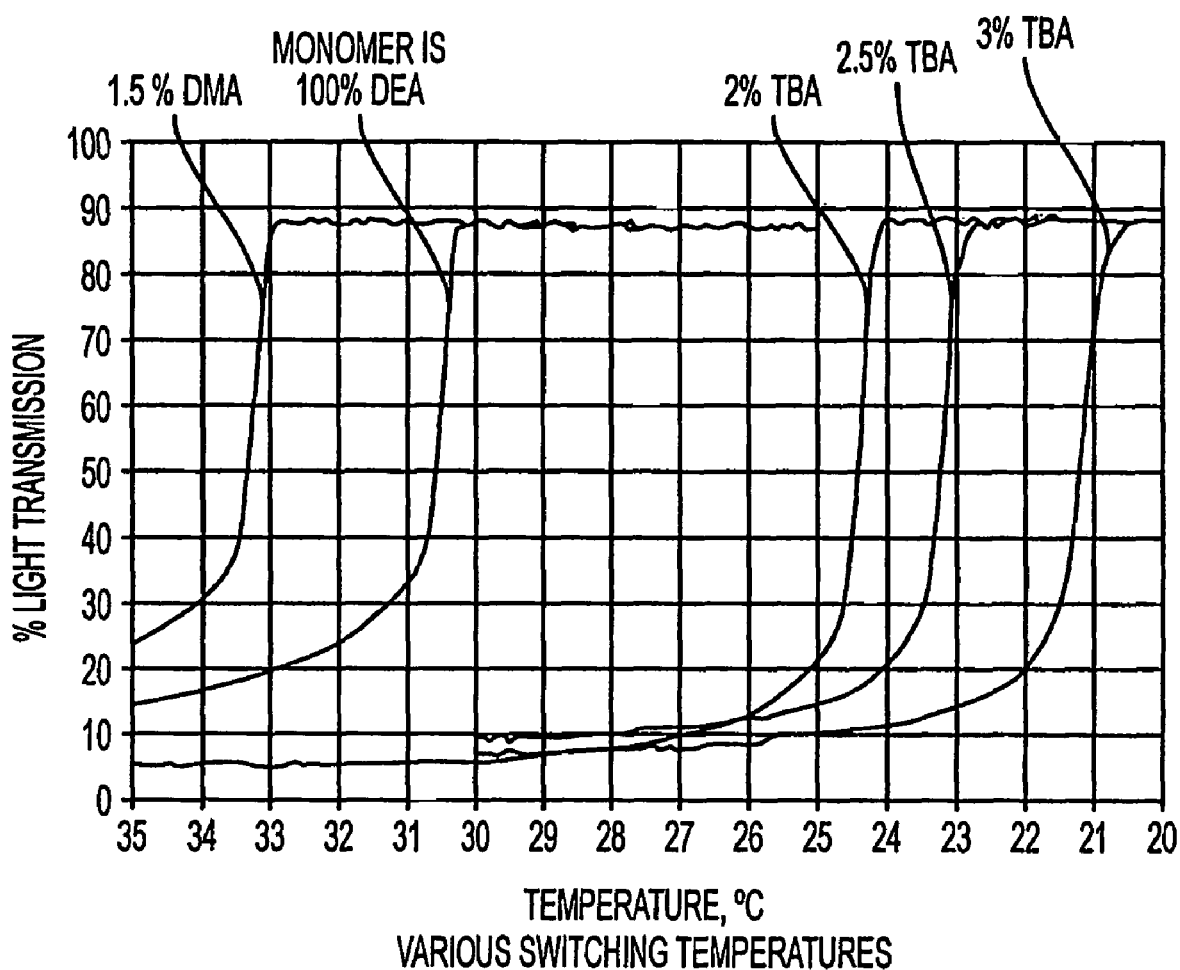
FIG. 2 shows the effect of monomer composition on switching temperature.
Figure 3:
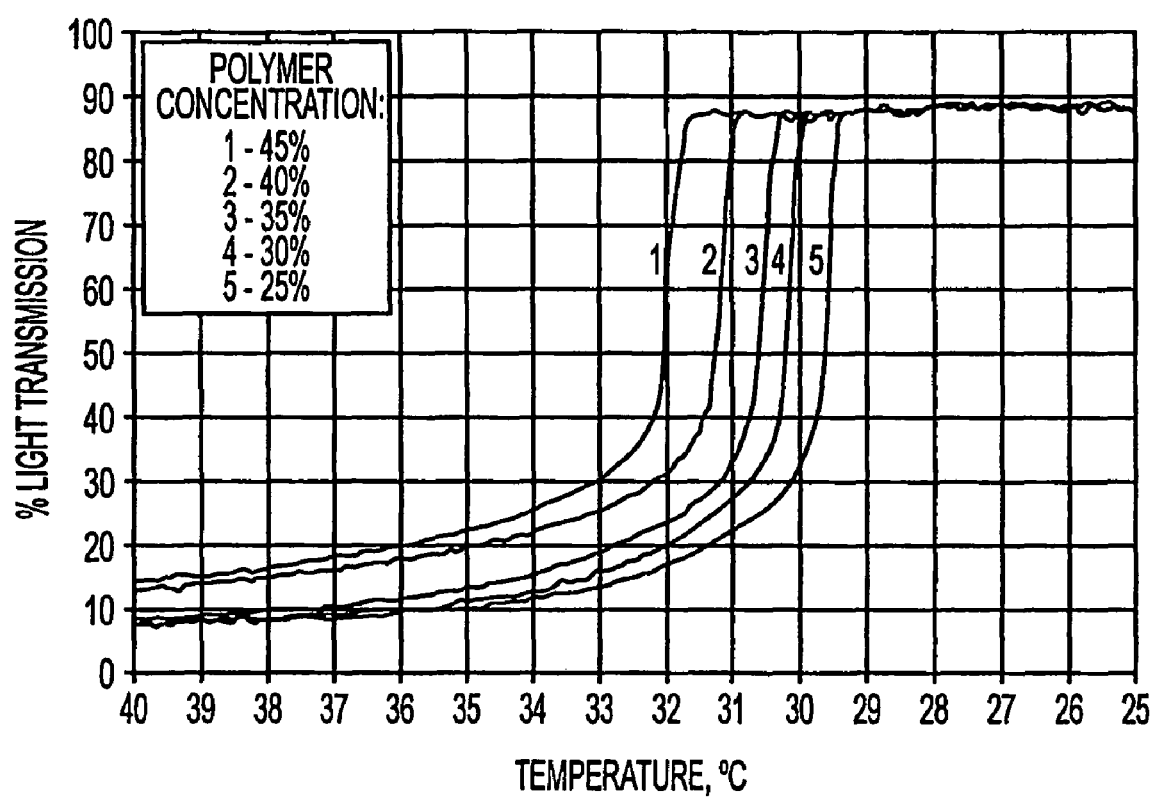
FIG. 3 shows the effect of polymer concentration on switching temperature.

The first example monomer, DEA, makes a homopolymer+water light valve with a switching temperature of 30.4° C. (see FIG. 3). In order to increase the switching temperature of the polymerized DEA, some of the second example monomer, DMA, is substituted for some of the DEA. FIG. 2 shows that substituting 1.5% by weight DMA for DEA increases the switching temperature to 33° C. Conversely, in order to lower the switching temperature, some of the third example monomer, TBA, is substituted for some of the DEA. FIG. 3 shows that a 2% substitution of TBA decreases the switching temperature to 24.3° C., while 3% TBA lowers the switching temperature to 20.7° C. The TBA does not satisfy all of the Monomer Specifications and Requirements because its tertiary butyl group is extremely hydrophobic, and thus forms strong hydrophobic interchain bonds. However, although the TBA and the MBA crosslinker, typically at 0.2% concentration, are poorly soluble in water, they are adequately soluble in the DEA+water solution because the DEA couples them into solution, due to their similar molecular structures. Since not more than 3% TBA is used, its interchain bonding and low solubility are not problems.

The Requirement for rapid and complete polymerization and crosslinking of the aqueous monomer solution argues for conjugated unsaturated monomers (such as substituted acrylamides) activated by a reducer+oxygen catalyst system. These catalysts swing into rapid action as soon as the reducer solution and the oxidizer solution are mixed, and they work well at low, e.g. 5° C., temperatures. A further advantage of some reducer+oxidizer is that the time for the polymerization and crosslinking reactions may be adjusted by adjusting the initial pH of the aqueous monomer and/or catalyst solution(s). A satisfactory reducer+oxygen catalyst system consists of persulphate+metabisulphite salts. This system and its reaction products (e.g. sodium sulfate) exhibit no absorption of solar ultraviolet light, and therefore cause no yellowing of the optical switch in sunlight. Further, at a typical concentration of 0.08% by weight solution of the catalyst, reaction products of sodium sulfate undergoes no reactions with the optical active polymer gel, or glass or plastic cover sheets. At such low concentrations of catalyst and crosslinker, the purity of the other components of the solution becomes more important for relatively complete polymerization. With an initial pH of 8.0, a polymerization and crosslinking, or gel formation, time of 10 minutes is typically obtained at 5° C. This is a useful gel time because it is as short as is possible, with most of the polymerization taking place after a typical 1 minute duration of filling the cavity between the cover sheets (see FIG. 1) with the monomer+crosslinker+catalyst solution. This gel time is desirable because if too much polymerization occurs during filling, the switching temperature and other optical properties may not be adequately uniform.

To protect the polymer from oxidation and photoxidation, a hindered amine stabilizer is dissolved into the solution. Pentamethyl piperidone, typically at 0.2% concentration, harmlessly decomposes free radical generators, e.g. hydrogen peroxide and ozone, and then regenerates itself, unlike sacrificial stabilizers, which lose their effectiveness. This hindered amine is used because it is soluble in the polymer+water solution, due to its hydroxy functionality.

Laboratory Procedures

After the two sheets of glass have been cut to size, and their sharp edges removed (called "seaming" the glass), the untinned side of the glass is washed. First the glass is scrubbed in a soap solution, such as 0.5% Alkonox in deionized water. Then the glass is rinsed in deionized water. Next the glass is soaked for 10 minutes in a hydrochloric acid solution with a pH of 2.0. The purpose of this mild etching probably is to remove the water soluble sodium and calcium ions from near the surface of the glass, so that the polymer may be bonded to the more durable silica portion of the glass. Hydrochloric acid is used because both sodium chloride and calcium chloride are soluble in water, and are thus removed from the glass surface. Next, the glass is rinsed in deionized water again, and then dried.

After drying, the glass is coated with a silane coupling agent, which later will covalently bond the polymerizing polymer chains in aqueous solution to the silica surface of the glass. The silane which has been found to work best is vinyl trimethoxy silane, prepared as a 1% solution in methyl alcohol which has previously been dehydrated with a molecular sieve. No water is added to this solution to prehydrolize the silane. The pH of this solution is adjusted to 7.0 with glacial acetic acid. The solution is used between two and six hours after it is prepared, with older solutions discarded.

This silane solution may be sprayed onto the glass with an airless spray gun, and with the solution pressurized to e.g. 150 kilograms per square centimeter. Alternately, a compressed air powered paint sprayer may be used. After the silane coating has dried (which is virtually instantaneous), the glass is placed in an oven to covalently bond the silane to the glass. A forced air oven at 100° C. may be used, and the silane coating may be cured for 20 minutes.

To fill the glass/cavity/glass sandwich (see FIG. 1), the monomer+crosslinker+catalyst aqueous solution is injected with a two barreled syringe. It may be preferred to use a 4:1 volume ratio between the two barrels, with the larger barrel called part A and the smaller barrel called part B. The reducer and the oxidizer components of the catalyst are placed in different barrels, so that when the cartridges are discharged into a static mixer leading to the fill port of the glass/cavity/glass sandwich, the two components mix and the polymerization, crosslinking and bonding to the cover sheets reactions all start. It has been found that the sodium persulphate oxidizer should be mixed with the monomer because when the sodium metabisulphite reducing agent is mixed with the monomer, then relatively rapid polymerization starts immediately, even before mixing with the sodium persulphate solution.

Part A typically consists of, by weight: 42% monomer+ 0.3% MBA, +0.3% pentamethyl piperidone, +0.05% sodium persulphate, and has a pH of 8.0, adjusted with dilute solutions of sulfuric acid and sodium hydroxide. Part B consists of 0.20% sodium metabisulphite, with A:B=4:1 by volume.

Because, as with most free radical+vinyl polymerizations, oxygen inhibits polymerization by quenching free radicals, parts A and B must have dissolved atmospheric oxygen removed from them before adequate and repeatable polymerization can occur. There are two outgasing procedures for doing this: first, while parts A and B are in the two separate cartridge cylinders, an inert gas, such as nitrogen, argon, or helium, may be bubbled through the solutions A and B for 10 minutes. Helium may be preferred for outgasing because its solubility in e.g. water does not decrease on heating, thus preventing bubbles from forming in the light valve. Second, the dissolved oxygen may be removed by placing the cartridge with the solutions A and B in the cartridge, but without the plungers in place, in a vacuum and boiling solutions A and B. A boiling chip placed at the bottom of each cartridge cylinder facilitates this out-gassing procedure. Either bubbling with an inert gas or vacuum boiling, or both, may be used.

Immediately when parts A and B leave the two cylinders of the syringe cartridge, they enter an e.g. static mixer with 10 mixing elements; this static mixer should have a small diameter to promote turbulence and consequent good mixing of the parts A and B. Poor mixing results in objectionable swirl patterns in the polymerized sample when it is close to its switching temperature. These patterns display the flow patterns of the solution during filling. At the end of the static mixer is fastened either a hypodermic needle of large internal diameter, or a die with a slot opening.

Figure 1B:
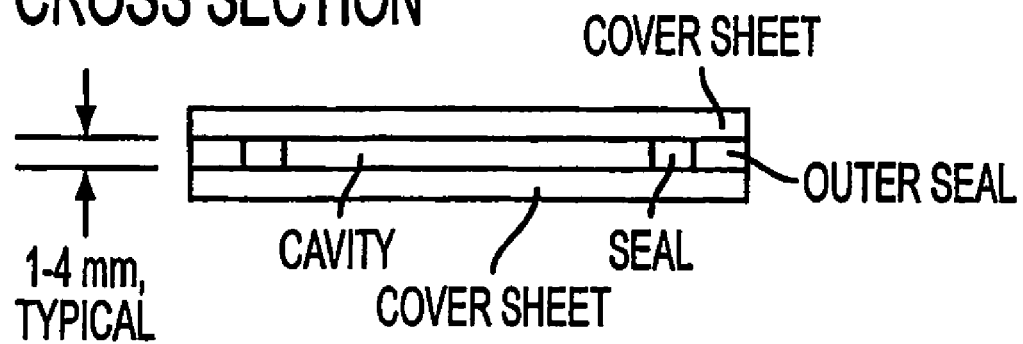

The unfilled sample, i.e. the glass/cavity/glass sandwich, may consist of two sheets of glass joined around their edges by a sealant, typically 1 centimeter wide (see FIG. 1). When a hypodermic needle is used to fill the sandwich with the mixed parts A and B, it may be pushed through the seal. When a die is used for filling, a gap is left in the seal which fits the die precisely to avoid leakage of the solution during filling. On the corners of the glass opposite the filling port, hypodermic needles may be inserted through the seal in order to allow the gas trapped in the cavity between the two layers of glass to escape during filling with the solution or, as illustrated in FIG. 1, there may be a small gap in the inner seal. Before the mixed parts A and B are injected into the sample, the oxygen-containing air in the cavity must be removed so that it doesn't prevent uniform polymerization. This may be done by flushing the cavity with an inert gas such as nitrogen, argon, or preferably helium. Alternately, the filling may take place in a vacuum chamber.

In order to prevent the heat of polymerization from switching the sample during polymerization, the glass/cavity/glass sandwich and the syringe containing parts A and B are placed in a 5° C. cooler for 15 minutes, and the mixed parts A and B are then injected immediately after the unfilled sandwich and syringe are removed from the cooler. Immediately after filling, the filled sandwich is placed back in the cooler. In approximately 10 minutes the polymerization has turned the solution from a liquid to a crosslinked gel.

At this point, the sample may be handled gently and is removed from the cooler. Then the hypodermic vent needles are removed and the holes left by the vent needles and the fill port may be closed with a band of outer sealant, typically one centimeter wide. This sealant forms a permanent seal around the perimeter of the sample (see FIG. 1, and the description of a sealant below).

Figure 4:
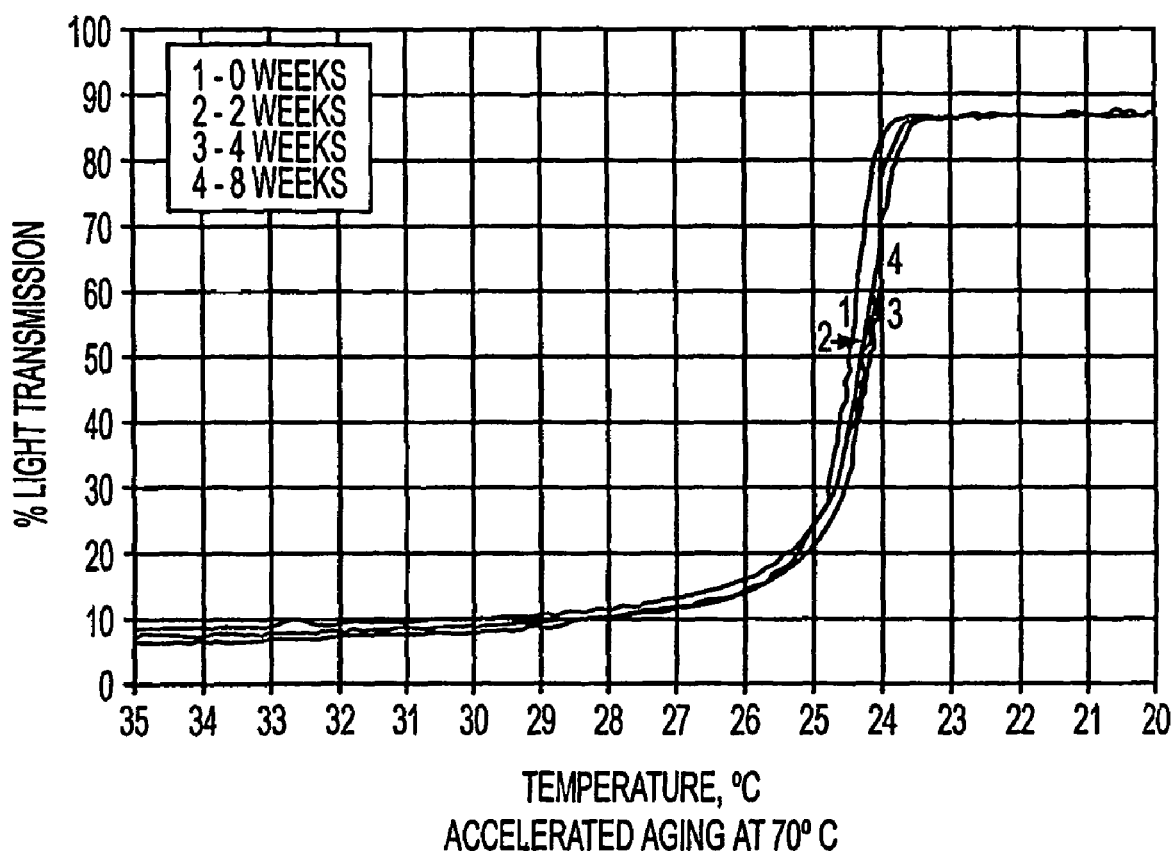
FIG. 4 shows the effect of heat aging on switching temperature.

The following list of tests to which the Examples of light valves may be put are useful for architectural glazings and other purposes: measuring the direct plus diffuse light transmission as a function of temperature; observing: haze, optical imperfections such as bubbles of solvent between the gel and a cover sheet i.e. delamination, non-uniform switching in the range, e.g. 10.5° C., of the switching temperature; and visible light absorption, such as a yellow cast measured by its visible light transmission spectrum with the light valve in its clear state. After the above measurements, the light value is subjected to accelerated aging by several methods: keeping in an oven at e.g. 70° C. for 8 weeks; exposing to a concentrated solar ultraviolet spectrum, e.g. 10 to 100 suns intensity; switching the light valve on and off with alternate heating and cooling; freezing and thawing the gel layer; and outdoor exposure. After each or several types of accelerated aging, applied separately, sequentially, or preferably simultaneously, then the previous tests are repeated and any changes noted. For the Example light valves, the most difficult test is 70° C. for 8 weeks. FIG. 4 shows some results from these tests.

Sealant Ingredients

A typical set of sealant ingredients are: Kraton L-2203 (K) from Shell Chemical, Poly bd Epol (E) from Mitsubishi Chemical, Vestanat TMDI trimethyl hexamethylene diisocyanate (T) from Creanova, epoxy cyclohexylethyl trimethoxy silane (G) from Gelest, pentamethyl piperidinol (P) from Aldrich, and Fomres UL-28 dimethyl tin dilaurate (D) from Witco. Hydrogen atoms attached to carbon atoms are not shown. For K and E, the molecular structures shown below are approximate and the subscripts are average values.

K:
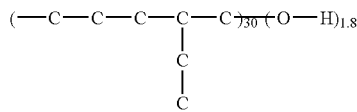

E:
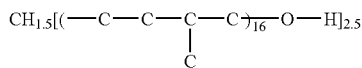

T:
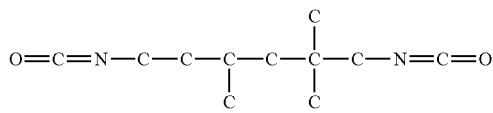

G:
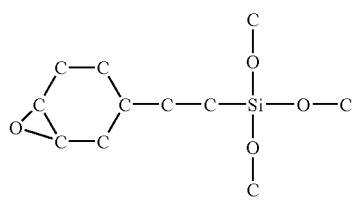

P:
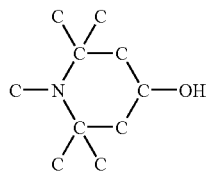

D:
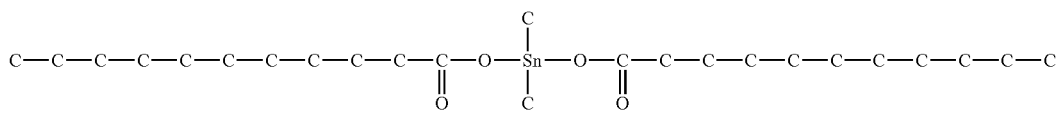

K and E form the basic polymer backbone. They are saturated hydrocarbon chains with protruding methyl or ethyl groups, and with terminal hydroxy functionality. The different sized groups protruding from the chain in somewhat random locations prevent close packing of the chains and subsequent crystallinity, and the flexible hydrocarbon backbone makes the resulting crosslinked sealant polymer a rubber, rather than a plastic. The saturation provides high resistance to thermal oxidation, solar ultraviolet light, hydrolysis, unwanted crosslinking or chain scission and a very low rate of water permeation. The hydroxy functionality allows turning both of these high viscosity liquid polymers (K and E) into a solid rubber by chain length extension, and by crosslinking the chains into a three dimensional net structure. The terminal location of the functionality gives more rapid and complete chain length extension and crosslinking and also greater mechanical strength. The elastic modulus and elongation of the sealant is determined by the ratio of E to K. More E, with its functionality of greater than 2, gives more crosslinks, and thus less elastic elongation and higher modulus of elasticity. K and E are relatively expensive because they are manufactured in small quantities.

T is a diisocyanate, which reacts with the hydroxy functionality of K and E to form the chain length extension and crosslinks or "cure". This diisocyanate crosslinker is preferred because it reacts relatively rapidly at 20° C. and is also resistant to thermal oxidation and sunlight, because it is also based on a saturated hydrocarbon, and especially because it is soluble in K and E. Poor mutual solubility of any of the ingredients results in an only partial cure. The protruding methyl groups make T soluble in K and E and also increase the sealant's flexibility by preventing the reacted or cured isocyanate groups from associating with each other due to their high polarity. The amount of T is 105% of stoichiometric, so that the excess will compensate for the adsorption of and reaction with atmospheric moisture during compounding, storage, and cure, which would deactivate its isocyanate functionality, thereby preventing a complete cure. Stoichiometry is based on the total hydroxy functionality of K, E, and P. The excess T also helps adhesion. T is highly toxic, but has a low vapor pressure at 20° C., so that skin contact, but not vapor inhalation, must be avoided.

G provides adhesion to e.g. glass cover sheets because its epoxy functionality reacts with the hydroxy functionality of K and E, and its methoxy silane functionality reacts with the hydroxy functionality on the surface of e.g. glass and stainless steel. The G which is bonded to K or E, and which has not also bonded to the cover sheets, forms crosslinks between the K+E+T polymer chains. This chemical bond crosslinking is activated by the diffusion into the sealant of atmospheric moisture, and so is much slower than the K+E+T crosslinking reaction.

P is a hindered amine, which harmlessly decomposes the hydrogen peroxide and ozone created by solar ultraviolet reacting with water and oxygen respectively, and thus protects the sealant from solar degradation through photoxidation. Its hydroxy functionality reacts with T to covalently bond it into the polymer network, so that it cannot diffuse out over time. The methyl group on the nitrogen prevents the amine in P from reacting with T, which would destroy the peroxide and ozone decomposing ability of P.

D is a catalyst for the reaction between T and the hydroxy functionality of K, E, and P. The laurate groups give it solubility in K and E, and the methyl groups, due to their small size, make this reaction relatively rapid and complete at room temperature.

Approximately 10% Carbon powder or flumed silica, preferably each with its own appropriate silane surface treatment, may be added to improve adhesion, elongation, and tear strength, by blocking crack propagation. These fillers also increase viscosity or thixotropy before cure, which makes homogeneous mixing more difficult, but may allow handling of the cover sheet/cavity/cover sheet sandwich before the outer sealant has cured.

Sealant Compounding and Performance

For a static mixer of parts A and B (not to be confused with the previous parts A and B used for making the optically active layer of gel) to work well, the ratio of A to B must not be greater than 4:1, and the viscosities of A and B must be similar. In order to minimize viscosity for ease of mixing, handling, and application, a 4 parts A to 1 part B ratio with the following formulation may be used:

| | Part A, percent by | | | Part B, percent by | |
|---|---|---|---|---|---|
| | mol | weight | | mol | weight |
| K | 31.1 | 64.44 | E | 6.5 | 12.80 |
| E | 7.5 | 14.80 | T | 49.2 | 7.20 |
| G | 3.8 | 0.50 | | | |
| D | 0.2 | 0.06 | | | |
| P | 1.7 | 0.20 | | | |

The G, P and D components can be made up as 10% solutions in K to so that they are more easily dispersed homogeneously throughout the part A. The P requires heating K to 70° C. to dissolve easily. For Part A, the components can be added sequentially with mixing for one hour in an airtight container with an inert gas blanket. The part B can be mixed vigorously in an airtight container with an inert gas blanket for 4 hours. During the mixing of part B, the E and T partially react to form a relatively low viscosity prepolymer.

The viscosities of sealant parts A and B are respectively approximately 15,000 and 10,000 centipoises at 20° C. When stored in moisture-tight containers, these parts A and B have a shelf life of 2 months at 5° C. When used with a 4:1 syringe cartridge and a 10 element static mixer, the sealant has a working time of 10 minutes, a green strength or gel time of 2 hours, and a cure time of 4 days, all at 20° C. The cured sealant has a very low water and water vapor transmission rate, a high resistance to thermal oxidation and sunlight, a high elastic elongation of approximately 1000%, low modules of elasticity (in order to minimize stress on the adhesive bond to the substrate), and good adhesion to e.g. glass and stainless steel, with cohesive rather than adhesive failure occurring after accelerated aging.

EXAMPLES

The formulation used for the light valve samples shown in FIGS. 2, 3, and 4 is, by weight, 35% monomer (consisting of DEA, optionally+DMA or TBA)+0.2% MBA+0.04% each of sodium persulphate and sodium metabisulphite+0.2% pentamethyl piperidone. The procedures described above in the Laboratory Preparation section were used. The optically active gel layer of these samples was 2 millimeters thick. The cover sheets were glass, and the above sealant formulation was used.

FIG. 3 shows the switching temperature of light valves with different concentrations of polymer in water, to simulate the effects of water loss by diffusion through a plastic cover sheet, or through the edge seal, or a ruptured edge seal. It may be seen that when the polymer concentration changes from 30% to 40%, the switching temperature changes by only 1.0° C., which is a satisfactory performance for some applications. FIG. 4 shows a light valve subjected to accelerated aging at 70° C. for 8 weeks. The switching temperature changes only 0.3° C., which is satisfactory for some applications.

Manufacturing Procedures

The preceding Laboratory Procedures are intended to be a relatively accurate model of a complete mass production manufacturing process. Where materials, equipment, procedures, parameters, conditions, or situations for manufacturing are not specified in this section, it may be assumed that the analogous item, specified in the Laboratory Procedures section applies. This typical process consists of the following Manufacturing Steps:

1. Cut and seam glass.
2. Wash, rinse, acid etch, rinse, and dry glass. The wash and etch steps may be combined by mixing a compatible soap with the hydrochloric acid. The washing machine must resist corrosion by the acid
3. Spray on silane. The spray booth must be explosion proof due to the methyl alcohol solvent for the silane. The flammable, toxic fumes from the ventilated booth can be removed with a water spray or may be incinerated.
4. Oven cure silane. To save oven space, the glass sheets may be stacked with a space between them for circulating hot air. The oven may be humidified to help bond the silane to the glass. The silane coating at the edges of the glass cover sheets, where the seal and the outer seal must adhere to the glass, may be ground off. However, accelerated aging of laboratory samples indicate that the silane coating improves adhesion.
5. There are two alternate procedures for forming the seal between the two sheets of glass (see FIG. 1). The first procedure is to use a typically 1 centimeter wide by 1 to 3 millimeters thick, 2-sided tape or ribbon of free-standing adhesive tape, such as Isotak made by 3M. The tape may be applied to the glass either from a hand held dispenser or with automated machinery. A second method of forming the seal is to extrude a bead of hot melt adhesive along the edges of one of the sheets of glass. Next, the second sheet of glass is placed on top of the hot melt adhesive on the first sheet of glass. This sandwich is then placed in a plate or roller hot press which simultaneously softens the hot melt adhesive and presses the two sheets of glass together, thus bonding the two sheets of glass together, and also determining the spacing between the two sheets of glass precisely. Fill and vent ports in the seal may be made by omitting the sealant or tape at the appropriate places. The seal allows handling of the filled sandwich (Step 9) after the optically active layer has gelled, but before the outer seal has been applied and gelled.

6. The above sandwich may be formed rapidly and simply by using what is called a "butterfly" table, which has a hinge down the middle of its flat surface. The sheet of glass with the tape or the extruded hot melt adhesive is placed on the table on one side of the hinge line. On the other side of the hinge line is placed the second sheet of glass. Then the horizontal surfaces of the table on either side of the hinge line are swung up to the vertical position, each half carrying its sheet of glass with it, thus forming the sandwich. Alternately, all of the preceding steps to form the sandwich may be done with the glass being almost vertical or horizontal, thus obviating the need for a butterfly table.

7. The sandwich is cooled to e.g. 5° C. A chamber with circulating cold air may be used. Inside this cooling chamber there may be a tilt table on which the glass/cavity/glass sandwich is placed during its cooling, filling and, optionally, during its polymerization or gelling. Alternately, the sandwich may be cooled by placing it on a flat metal plate which is cooled, and placing a layer of thermal insulation on top of the sandwich. The dispenser of the mixed A, B and possibly C solutions, may be housed in a ventilated glove box for safety from toxic monomers, and may also be inside this cooling chamber.

8. The dispenser needle(s) or die(s) may be inserted into the side of the sandwich by hand or in an automated fashion. Simultaneously with Step 7, the sandwich cavity is flushed with an inert gas through the injection die(s) or needle(s).

9. The cavity of the sandwich, which may be cooled to e.g. 5° C., is next filled with the solution consisting of parts A, B, and possibly C mixed together homogeneously, and possibly precooled to e.g. 5° C.

Unlike the Laboratory Procedure, which uses a 2 component hand-held syringe, for Manufacturing a meter/mix pump is used. This may be a 2 or 3 component meter/mix with the ratios for A, B, and possibly C being e.g. 4:1:1 or 1:1:1. 3 components may be used instead of 2 because a solution containing both the monomer and either of the 2 catalyst parts has a short shelf life. When using 3 components with a 4:1:1 ratio, component A could then consist of an aqueous solution of all of the ingredients except the reducer and the oxidizer catalyst components. Part B may consist of an aqueous solution of e.g. the reducer sodium metabisulphite, and part C may consist of an aqueous solution of e.g. the oxidizer sodium persulphate. Parts A and C, and especially, Part B with a reactive reducer, may then be protected from atmospheric oxygen with inert gas bubbling and/or an inert gas blanket. When it is a persulfate solution, fresh part C is prepared every e.g. 4 hours. Alternately a 1:1:1 ratio may be used, where part A may consist of the monomer and any other organic components and possibly some water, part B may be an aqueous solution of the reducer catalyst, and part C may be an aqueous solution of the oxidizer catalyst. The dissolved atmospheric oxygen in the solutions A, B, and C, is removed with a vacuum spray, curtain, or boil, and/or with bubbling an inert gas.

It is preferred that the meter/mix uses gear pumps in order to maintain a relatively precise ratio of components, which is necessary for a uniform switching temperature of the light valve. The meter/mix can use a dynamic mixer (preferably disposable) in addition to, or instead of, the static mixer in order to ensure uniform mixing. The metering function of the meter/mix enables stopping the pumping when the correct volume has been pumped to fill the cavity in the sandwich to the desired thickness, that is, the thickness of the seal. Steps 8, 9, and 10 can be controlled automatically, where the operator only has to input to a controller of the meter/mix the cover sheets' size and the cavity thickness, inserts the die(s) and/or needle(s), and then pushes a flush-then-fill button.

The outgassed, pumped, and metered parts A, B, and possibly C leave their respective gear pumps, are cooled, and then their flow paths join together, next flowing into a static and/or dynamic mixer, preferably disposable, with optional cooling. The output of the mixer(s) may also be valved to a source of the inert gas which is used to flush air from the sandwich cavity. Following the flow path, the flushing and filling die(s) or needle(s) come next. The die(s) or needle(s) are inserted into the cooled, unfilled sandwich, which is first flushed with inert gas (Step 8). Then, by switching a valve, the mixed parts A, B and possibly C are injected, which, due to the low viscosity of this mixture (approximately 200 centipoises), can fill a 1 meter by 1 meter sample in 1 minute.

During filling, the unfilled sandwich may be placed on a tilt table which may be inside the cooling chamber, or may be a cooled metal plate (Step 7), where it is cooled to and maintained at e.g. 5° C. (Step 7). The tilt table is used because tilting the sandwich so that the fill port(s) are at the bottom, and the vents are above, facilitates removing all of the gas when the cavity is being filled with the mixed parts A, B, and possibly C, thus preventing bubble formation. The table may be tilted manually or automatically.

During filling, the filling port(s) of the sandwich and/or the meter/mix dispenser may be contained within a ventilated glove box in order to prevent toxic fumes from the monomer in part A from escaping. This glove box may be inside the cooling chamber. Any excess of parts A, B, or possibly C, or water for flushing the meter/mix etc. coming from a needle, die, or the meter/mix may be toxic, and so can be pumped to a waste container, stored, and disposed of. After the gelling or curing of the injected solution, the vent needles and injector die(s) or needle(s) can be removed from the sandwich edges for cleaning by e.g. flushing with water, or for disposal.

10. After the filling and bubble removal are completed, the tilt table is made horizontal so that the thickness of the mixed parts A, B and possibly C, is uniform, for uniform reflectivity and appearance when the light valve is above its switching temperature and is white. In this horizontal position, the sample may be cured e.g. for 10 minutes at 5° C. In order to increase production line speed, during cure the sandwiches may be stacked horizontally with space between them for circulating cold air to remove the heat of polymerization. This stacking is analogous to the stacking in the oven to cure the silane (Step 4). However, in this case, the stack of sandwiches must move with very little vibration or deviation from the horizontal, because these may disrupt the formation of a strong, homogeneous gel that is well bonded to the two cover sheets.

11. The outer seal is applied, either manually or with automated machinery. It may be made of the same 2 components as used for the outer seal in the Laboratory Procedure (see the description of a sealant above). Approximately 10% of a finely divided carbon or silica filler may be added to this formulation in order to make it thixotropic, so that the sandwich can be handled immediately after application of the sealant, and before the sealant has gelled or cured. These 2 sealant components are mixed together and dispensed using a meter/mix machine which may be similar to the meter/mix used for pumping and mixing the solution parts A, B and possibly C except that: there are only 2 components for the sealant; the accuracy of the ratio is not as critical; and the viscosity of the sealant is much greater, approximately 15,000 centipoises.

Alternately, the outer seal can be made with a hot-melt sealant. For this purpose, a good sealant is Delchem 2000, which is both durable and has low moisture permeability because, like the above sealant, it is a saturated hydrocarbon, i.e. polyisobutylene with grafted pendant methoxy silane functionality. It covalently adheres and crosslinks slowly upon exposure to atmospheric moisture. An advantage of this sealant is that because it is a hot-melt, it is not necessary to wait for crosslinking to occur before it is safe to handle the light valve. This sealant was developed to keep water vapor out of sealed insulated windows. The hot-melt sealant may be pumped to a heated application gun from a heated platen piston pump drum unloader with a heated hose.

Steps 7, 9, 10, and 11 do involve a small amount of hand labor, which is acceptable for mass production, although these steps could also be totally automated. Almost all of the manufacturing equipment required for the above procedures is commercially available, but is being used for other purposes. Most of the above Manufacturing Steps, including Steps 1, 2, 5, 6, 8, and 11, are either identical with or very similar to the operations which are performed during the automated manufacture of a different product: sealed double pane windows. The additional Manufacturing Steps and equipment are: the acid wash and rinse (2), the silane spray (3), and its oven cure (4), the cooling chamber or plate (7), the tilt table (10), and filling with the meter/mix (9). Therefore, the easiest way to build the machinery to mass produce these light valve sandwiches is to adapt, modify, and add on to existing automated machinery made for manufacturing sealed windows.

CONCLUSIONS

A rapid manufacturing process for light valve samples and products is made possible by using a low viscosity solution of molecularly designed monomers, such as for example, aqueous solutions of N-substituted acrylamide monomers with low melting points, and an acrylamide crosslinking or difunctional monomer, all of which, after filling a glass/cavity/glass sandwich, are polymerized with a previously added catalyst of e.g. persulfate+metabisulphite salts. A sealant which cures at room temperature, resists degradation by water, oxygen, heat and sunlight, may be thixotropic before curing, has low modulus, high elongation, and is extremely impermeable to water can be made from saturated hydrocarbon liquid polymers with terminal hydroxy functionality and saturated hydrocarbon diisocyantes.

A coherent set of procedures, materials, equipment, and process parameters for preparing and manufacturing light valves are described above. These light valves perform satisfactorily as architectural glazings, and in other applications, regarding: range of switching temperatures available, sharpness of switching temperature, opacity or reflectivity when switched off (white), high light transmission and optical quality when switched on (transparent), uniformity of switching temperature, minimal change of switching temperature and absence of optical defects, haze, or yellowing after accelerated aging by: extended heating, repeated switching, water loss, or concentrated solar ultraviolet light.

The time for filling a 1 square meter glass/cavity/glass sandwich with a 2 millimeter thick cavity is typically 1 minute (improved over the prior art by a factor of approximately 50), and the time after filling to forming a gel is typically 10 minutes (improved over the prior art by a factor of approximately 20). Since the filling and gelling were, in the prior art, the slow steps in sample and product preparation, both of these improvements taken together make possible a rapid mass production process. Typical manufacturing methods, machinery, materials, and process parameters, all of which are suitable for mass producing light valves for architectural glazings, are described in detail above. All of the above materials, methods, and process parameters are by way of illustrating the more general categories of the basic inventions claimed herein.

The invention claimed is:

1. A light valve comprising:
two cover layers,
at least one of which is transparent,
and an optically active layer between these cover layers,
with the optically active layer including:
a solution comprising a polymer dissolved in a solvent,
with the polymer and the solvent reversibly forming finely divided separate phases upon heating to a specific temperature,
thereby reversibly turning the optically active layer from relatively transparent to relatively opaque, wherein:
most of said polymer is formed between said cover layers by polymerizing a monomer which is dissolved in said solvent.

2. The light valve of claim 1, wherein:
said monomer is at least 15% soluble in said solvent at a temperature low enough that the heat of polymerization of said monomer does not rise to the phase separation temperature of the solution comprising said solvent, said monomer, and said polymer which is in the process of being formed from said monomer.

3. The light valve of claim 1, wherein:
a crosslinking monomer is added, with a functionality of two or more, and which copolymerizes with said monomer, and which is soluble in the solution comprising said solvent and said monomer, which is added to the solution so that said polymerization forms a crosslinked gel.

4. The light valve of claim 1, wherein:
said solvent is primarily water.

5. The light valve of claim 1, wherein:
said monomer's polymerization is rapid, repeatable, and relatively complete, due to its conjugated unsaturation.

6. The light valve of claim 5, wherein:
said conjugated unsaturation is acrylamide.

7. The light valve of claim 6, wherein:
said acrylamide has a saturated hydrocarbon group substituted onto an unsaturated carbon atom.

8. The light valve of claim 7, wherein:
said acrylamide has N-substituted group or groups that are saturated hydrocarbons.

9. The light valve of claim 8, wherein:
more than half of said monomer is N-diethyl acrylamide, N-diethyl methacrylamide or a mixture thereof.

10. The light valve of claim 1, wherein:
said monomer is a mixture of monomers which are selected and proportioned such that the light valve switches at a desired temperature.

11. The light valve of claim 10, wherein:
said mixture of monomers forms a copolymer that is relatively random.

12. The light valve of claim 1, wherein:
said polymer includes polymer chains which do not have many non-chemical interchain bonds which reversibly crosslink the chains.

13. The light valve of claim 1, wherein:
the backbone of said polymer is relatively free from stearic hindrance and is flexible when dissolved in said solvent in order for said polymer's phase separation with said solvent to occur over a narrow temperature band.

14. The light valve of claim 1, wherein:
said polymer formed does not react with said solvent, oxygen, upon exposure to sunlight or a combination thereof.

15. The light valve of claims 1 or 3, wherein:
a catalyst for said polymerization is a reducer and an oxidizer.

16. The light valve of claim 15, wherein:
said catalyst is a persulfate salt plus a metabisulfite salt.

17. The light valve of claim 1, wherein:
the light valve is stabilized against aging by oxygen and ultraviolet light by the addition of a hindered amine stabilizer which is soluble in said solution.

18. The light valve of any one of claim 1 through 14 or 17, wherein:
it is used to make architectural glazings that control unwanted solar heat and glare.

19. A process for making a light valve which includes:
two cover layers,
at least one of which is transparent,
and an optically active layer between these cover layers,
with the optically active layer including:
 a polymer dissolved in a solvent,
  with the polymer and the solvent reversibly forming finely divided separate phases upon heating to a specific temperature,
  thereby reversibly turning the optically active layer from relatively transparent to relatively opaque,
wherein:
most of said polymer is formed between said cover layers by polymerizing a monomer which is dissolved in said solvent, the process comprising:
forming a seal between the two cover layers, and with the seal spacing apart the cover layers, thus forming a cavity, wherein:
said cavity is flushed with an inert gas and subsequently into said cavity is injected a liquid which then becomes a solid layer, with the solid layer having a variable transmission of light.

20. The process of claim 19, wherein:
said liquid includes a monomer solution.

21. The process of claim 19, wherein:
said cover layers are etched to improve the adhesion between said cover layers and said solid layer.

22. The process of claim 19, wherein:
a silane is applied to said cover layers to improve the adhesion between said cover layers and said solid layer.

23. The process of claim 22, wherein:
said silane is a vinyl silane.

24. The process of claim 22, wherein:
said cover layers are heated to bond said silane to said cover layers before said injecting.

25. The process of claim 19, wherein:
said cover layers joined with said seal are cooled at one or more of the following: before said injecting, during said injecting, when said liquid is becoming said solid layer, in order to prevent the heat thereby released from reducing said light valve's optical performance or resistance to aging.

26. The process of claim 19, wherein:
said liquid is cooled before said injecting in order to prevent the heat released from said liquid becoming said solid layer from reducing said light valve's optical performance or resistance to aging.

27. The process of claim 19, wherein:
said cavity is flushed with said inert gas to prevent incomplete polymerization, or bubble formation in said solid layer.

28. The process of claim 27, wherein:
the inert gas is nitrogen, argon, or helium.

29. The process of claim 19, wherein:
dissolved gases are removed from said liquid before it is injected into said cavity to prevent incomplete polymerization, or bubble formation in said solid.

30. The process of claim 19, wherein:
said liquid is formed by combining two or three liquid components delivered by synchronized metering pumps in order to have a constant ratio between said components, and to fill said cavity with the desired volume of said liquid.

31. The process of claim 19, wherein:
said liquid is injected into said cavity through slot die(s) or hollow needle(s).

32. The process of claim 19, wherein:
a tilting top table is used to help prevent, or to remove bubbles from said liquid in said cavity before it becomes said solid.

33. The process of claim 19, wherein:
said seal is made from a two-sided tape or a ribbon of adhesive.

34. The process of claim 19, wherein:
said seal is made from a sealant that softens upon heating, and becomes a solid again on cooling.

35. The process of claim 34, wherein:
said two cover layers with said sealant placed between them are placed in a flat or roller press which is heated in order to soften and compress said sealant in order to form the desired spacing between said cover layers, and to bond said cover layers together.

36. The process of claim 19, wherein:
after said liquid has become said solid, an outer seal is formed outside, said outer seal to form a durable mechanical connection between said two cover layers.

37. The process of claim 36, wherein:
said outer seal is made from a sealant that melts upon heating for application as a liquid, and becomes a solid again on cooling.

38. The process of claim 36, wherein:
said outer seal is made with a sealant based on a saturated hydrocarbon liquid or solid polymer, with functionality for crosslinking.

39. The process of claim 19, wherein:
said light valve is made on production machinery that has been designed for making sealed double pane windows, and that has been modified for making said cavity thinner, and has been added on to enable injecting said liquid into said cavity.

40. The process of claim 39, wherein:
the light valve is used to make architectural glazings that control unwanted solar heat or glare.

41. The process of claim 19 wherein:
some of the apparatus for preparing said liquid for said injecting, and/or for injecting said liquid, is contained within a cooling chamber.

42. The process of claims 19, 25 or 32, wherein:
said injecting is performed on a tilting top table, and/or a cooled plate.

43. The light valve of claim 3, wherein:
a catalyst present for said crosslinking monomer is a reducer and an oxidizer.

44. A process for making the light valve of claim 19 wherein the seal includes fill and vent ports.

45. The process of claim 32, wherein:
the tilting top table is cooled.

46. The process of claim 44, wherein said outer seal covers said fill and vent ports, and prevents loss of liquid components of said solid layer.

47. The process of claim 42 wherein said injecting is performed within a cooling chamber.

48. The process of claim 20 wherein said monomer is at least 15% soluble in said solvent at a temperature low enough that the heat of polymerization of said monomer does not rise to the phase separation temperature, of the solution comprising said solvent, said monomer and said polymer, which is in the process of being formed from said monomer.

49. The process of claim 20 wherein a crosslinking monomer is added, with a functionality of two or more, and which copolymerizes with said monomer, and which is soluble in the solution comprising said solvent and said monomer, which is added to the solution so that said polymerization forms a crosslinked gel.

50. The process of claim 20, wherein said solvent is primarily water.

51. The process of claim 49, wherein said monomer's polymerization is rapid, repeatable, and relatively complete, due to its conjugated unsaturation.

52. The process of claim 51, wherein said conjugated unsaturation is acrylamide.

53. The process of claim 52, wherein said acrylamide has a saturated hydrocarbon group substituted onto an unsaturated carbon atom.

54. The process of claim 52, wherein said acrylamide has an N-substituted group or groups that are saturated hydrocarbons.

55. The process of claim 51, wherein more than half of said monomer is N-diethyl acrylamide, N-diethyl methacrylamide or a mixture thereof.

56. The process of claim 20, wherein said monomer is a mixture of monomers which are selected and proportioned such that the light valve switches at a desired temperature.

57. The process of claim 56, wherein said mixture of monomers forms a copolymer that is relatively random.

58. The process of claim 19, wherein: said polymer includes polymer chains which do not have many non-chemical interchain bonds which reversibly crosslink the chains.

59. The process of claim 19, wherein the backbone of said polymer is relatively free from stearic hindrance and is flexible when dissolved in said solvent in order for said polymer's phase separation with said solvent to occur over a narrow temperature band.

60. The process of claim 19, wherein said polymer formed does not react with said solvent, oxygen, upon exposure to sunlight or a combination thereof.

61. The process of claim 19, 49 or 50 wherein a catalyst for said polymerization is a reducer and an oxidizer.

62. The process of claim 61, wherein said catalyst is a mixture of a persulfate salt and a metabisulfite salt.

63. The process of claim 19, wherein the light valve is stabilized against aging by oxygen and by ultraviolet light, by the addition of a hindered amine stabilizer, which is soluble in said optically active layer and said liquid.

64. The light valve of claim 8, wherein the acrylamide has the following general structure:

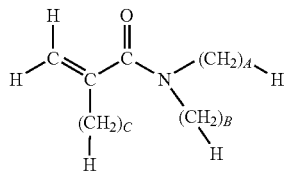

wherein A+B+C is between 2 and 5.

* * * * *